US012562921B2

(12) United States Patent
Rivera et al.

(10) Patent No.: US 12,562,921 B2
(45) Date of Patent: Feb. 24, 2026

(54) CERTIFICATE ENROLLMENT FOR SHARED NETWORK ELEMENT

(71) Applicant: RAKUTEN MOBILE, INC., Tokyo (JP)

(72) Inventors: Francesca Rivera, Tokyo (JP);
Raghavendran Ramiya, Indore (IN);
Ritesh Kumar Kalle, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 173 days.

(21) Appl. No.: 18/002,984

(22) PCT Filed: Oct. 27, 2022

(86) PCT No.: PCT/US2022/048043
§ 371 (c)(1),
(2) Date: Dec. 22, 2022

(87) PCT Pub. No.: WO2023/239396
PCT Pub. Date: Dec. 14, 2023

(65) Prior Publication Data
US 2024/0235851 A1 Jul. 11, 2024

Related U.S. Application Data

(60) Provisional application No. 63/351,142, filed on Jun. 10, 2022.

(51) Int. Cl.
*H04L 9/32* (2006.01)
*H04L 9/08* (2006.01)

(52) U.S. Cl.
CPC .......... *H04L 9/3265* (2013.01); *H04L 9/0825* (2013.01); *H04L 9/3268* (2013.01)

(58) Field of Classification Search
CPC ..... H04L 9/08; H04L 9/32; H04L 9/40; H04L 9/326; H04L 9/0819; H04L 9/0825;
(Continued)

(56) References Cited

U.S. PATENT DOCUMENTS

2016/0344559 A1* 11/2016 Ma ...................... H04W 12/069
2017/0300678 A1* 10/2017 Metke ................. H04W 12/068
(Continued)

FOREIGN PATENT DOCUMENTS

JP 2021-190805 A 12/2021

OTHER PUBLICATIONS

International Search Report (PCT/ISA/210) dated Mar. 6, 2023 issued by the International Searching Authority in International Application No. PCT/US22/48043.
(Continued)

*Primary Examiner* — James N Fiorillo
(74) *Attorney, Agent, or Firm* — Sughrue Mion, PLLC

(57) ABSTRACT

A method of providing secure connections between a shared network node and a plurality of network nodes of different mobile network operators (MNOs) is provided. The method includes: receiving, by a first network node of a first MNO among the different MNOs, a digital certificate issued to the first network node from a public key infrastructure (PKI) service provider, the PKI service provider having a trust relationship with the different MNOs; establishing, by the first network node, a secure connection with a second network node of the first MNO using the issued digital certificate and based on the trust relationship; and establishing, by the first network node, a secure connection with a third network node of a second MNO, among the different MNOs, using the issued digital certificate and based on the trust relationship.

14 Claims, 14 Drawing Sheets

(58) Field of Classification Search
CPC ... H04L 9/3263; H04L 9/3268; H04L 63/062;
H04L 63/0823; H04L 63/0892; H04W
88/08; H04W 12/04; H04W 12/06; H04W
12/08; H04W 12/60; H04W 12/66; H04W
12/069; H04W 12/0431; H04W 4/20;
H04W 88/085; H04W 48/18; H04W
24/10; H04W 24/12; H04W 16/14
USPC ......................................................... 713/157
See application file for complete search history.

(56) References Cited

U.S. PATENT DOCUMENTS

| | | | | |
|---|---|---|---|---|
| 2017/0325094 A1* | 11/2017 | Lee | ........................ | H04W 12/06 |
| 2019/0208405 A1* | 7/2019 | Park | ...................... | H04W 88/02 |
| 2019/0313241 A1* | 10/2019 | Ahmed | .............. | H04W 12/069 |
| 2020/0106624 A1* | 4/2020 | Russell | ................. | H04W 12/37 |
| 2021/0234803 A1* | 7/2021 | Parekh | ................ | H04W 72/543 |
| 2021/0243840 A1* | 8/2021 | Raghothaman | ....... | H04L 5/0044 |
| 2022/0038902 A1* | 2/2022 | Mueck | ................ | H04L 63/1433 |
| 2023/0007483 A1* | 1/2023 | Mueck | ................. | G06Q 50/265 |
| 2023/0049987 A1* | 2/2023 | Qiu | ...................... | H04W 12/069 |
| 2023/0106668 A1* | 4/2023 | Taft | ........................ | H04W 12/06 726/2 |
| 2023/0397031 A1* | 12/2023 | Mehta | ................... | H04W 24/10 |
| 2024/0129194 A1* | 4/2024 | Mueck | ................... | G06F 21/64 |

OTHER PUBLICATIONS

Written Opinion (PCT/ISA/237) dated Mar. 6, 2023 issued by the
International Searching Authority in International Application No.
PCT/US22/48043.
Mavenir, "Security in Openran", White Paper, 2021,pp. 1-3, 8-11,
26 (9 pages total) URL: https://mavenir.com/wp-content/uploads/
2021/02/OpenRAN-Security-Whitepaper_Mavenir_-FINAL01202021-
002-1.pdf.
Ericsson, "Change Request, Use of fields in CMPv2", 3GPP TSG-
SA WG3 Meeting #90Bis, S3-180720, Rel-14, Feb. 26-Mar. 2, 2018
(4 pages).
O-RAN Alliance, "O-RAN Working Group 4 (Open Fronthaul
Interfaces WG) Management Plane Specification", O-RAN-WG4.
MP.0-v09.00 Technical Specification, 2022 (232 pages).

* cited by examiner

FIG. 5

Receive, from PKI service provider, certificate issued to first network node of first MNO        S1310

Establish secure connection between first network node and second network node of first MNO        S1320

Establish secure connection between first network node and third network node of second MNO        S1330

1400

CERTIFICATE ENROLLMENT FOR SHARED NETWORK ELEMENT

CROSS-REFERENCE TO RELATED APPLICATION(S)

This application is a National Stage of International Application No. PCT/US2022/048043, filed on Oct. 27, 2022, claiming priority based on U.S. Provisional Patent Application No. 63/351,142, filed on Jun. 10, 2022, the disclosure of which is incorporated by reference herein in its entirety.

BACKGROUND

1. Field

Apparatuses and methods consistent with example embodiments of the present disclosure relate to a system which establishes a trust exchange between multiple mobile network operators, and provides certificate management for a shared Open Radio Access Network (O-RAN) radio unit (O-RU).

2. Description of Related Art

A radio access network (RAN) is an important component in a telecommunications system, as it connects end-user devices (or user equipment) to other parts of the network. The RAN includes a combination of various network elements (NEs) that connect the end-user devices to a core network. Traditionally, hardware and/or software of a particular RAN is vendor specific.

Open RAN (O-RAN) technology has emerged to enable multiple vendors to provide hardware and/or software to a telecommunications system. To this end, O-RAN disaggregates the RAN functions into a centralized unit (CU), a distributed unit (DU), and a radio unit (RU). The CU is a logical node for hosting Radio Resource Control (RRC), Service Data Adaptation Protocol (SDAP), and/or Packet Data Convergence Protocol (PDCP) sublayers of the RAN. The DU is a logical node hosting Radio Link Control (RLC), Media Access Control (MAC), and Physical (PHY) sublayers of the RAN. The RU is a physical node that converts radio signals from antennas to digital signals that can be transmitted over the fronthaul to a DU. These entities have open protocols and interfaces between them, which thereby allows different vendors to provide nodes (or network elements) in one RAN.

The current lower layer split architecture (i.e., split between O-RAN RU (O-RU) and O-RAN DU (O-DU)) in O-RAN is constrained by having an O-RU node operate with a single O-DU node. This limits the ability of fronthaul systems to be used to deliver enhanced use cases where multiple O-DU nodes can be used to enhance the capabilities offered using O-RAN's open fronthaul specifications.

A common O-RU (or Shared O-RU) operated by a plurality of O-DU nodes could provide support for enhanced capabilities when using O-RAN's lower layer split in both single and multiple operator deployments. For example, a Shared O-RU could support enhanced scalability and/or enhanced availability and/or enable access-specific node deployments in fronthaul systems, where multiple O-DU nodes are deployed by a single operator and connected to a shared O-RU. Further, a Shared O-RU could support enhanced sharing capabilities where multiple O-DU nodes are deployed by different operators and connected to the common Shared O-RU node.

Some example use cases of such O-RU sharing in which the common O-RU is operated with plural O-DUs include:

RAN sharing—Multi operator Radio Access Network (MORAN) use-case in O-RAN

Multi-Vendor Slicing use-case in O-RAN.

Shared O-RU for super rural areas—regulatory requirements often force operators to provide coverage in sparsely populated areas which are not business-attractive or high subscriber areas, causing profitability issues.

To this end, RAN sharing is a promising solution to reduce network costs, increase network capacity and coverage, while enhancing customer satisfaction. However, there is no clear mechanism in which to establish a secure connection between the common O-RU and the plurality of O-DUs. For example, in the context of a common O-RU to be operated with a plurality of O-DUs in a multi-operator deployment, there exists a lack of trust exchange between operators. Current certificate management for O-RUs is handled by the operator certificate authority (CA), where the operator owns the O-RU that is operated by a single O-DU. Thus, certificate management for shared O-RU use cases such as MORAN, Vendor Slicing, rural uses, etc., remains unsolved.

SUMMARY

According to embodiments, systems and methods are provided for establishing trust between multiple operators sharing a common O-RU and handling certificate management for the common O-RU.

According to embodiments, systems and methods provide an O-RAN public key infrastructure (PKI) service provider to issue certificates to the common or shared O-RU, and with which multiple operators establish a trust relationship, thereby providing a certificate management solution for shared O-RU use cases such as MORAN, Vendor Slicing, Rural uses, etc. As a result, Mobile Network Operators (MNOs) can authenticate a shared O-RU using certificates issued by the O-RAN PKI service provider, and can expand their network coverage (e.g., to rural areas) with reduced cost.

In accordance with an aspect of an example embodiment, a first network node of a first mobile network operator (MNO), among a plurality of MNOs, includes: a memory storing instructions; and at least one processor configured to execute the instructions to: receive a digital certificate issued to the first network node from a public key infrastructure (PKI) service provider, the PKI service provider having a trust relationship with the plurality of MNOs; establish, by the first network node, a secure connection with a second network node of the first MNO using the issued digital certificate and based on the trust relationship; and establish, by the first network node, a secure connection with a third network node of a second MNO, among the plurality of MNOs, using the issued digital certificate and based on the trust relationship.

The first network node may be a radio unit (RU) of the first MNO, the second network node may be a distributed unit (DU) of the first MNO, and the third network node may be a DU of the second MNO.

The RU may be a 4G or 5G RU configured with a functional radio access network (RAN) split.

The RU may be an Open RAN (O-RAN) RU (O-RU), and the DU of the first MNO and the DU of the second MNO may be O-RAN DUS (O-DUS).

The first network node may be a base station of the first MNO, the second network node may be a core network node of the first MNO, and the third network node may be a core network node of the second MNO.

The at least one processor may be configured to execute the instructions to receive the digital certificate in accordance with EST protocol or Certificate Management Protocol.

The at least one processor may be configured to execute the instructions to: transmit a certificate signing request (CSR) to the PKI service provider; and receive the digital certificate based on the transmitted CSR.

In accordance with an aspect of an example embodiment, a method of providing secure connections between a shared network node and a plurality of network nodes of different mobile network operators (MNOs), includes: receiving, by a first network node of a first MNO among the different MNOs, a digital certificate issued to the first network node from a public key infrastructure (PKI) service provider, the PKI service provider having a trust relationship with the different MNOs; establishing, by the first network node, a secure connection with a second network node of the first MNO using the issued digital certificate and based on the trust relationship; and establishing, by the first network node, a secure connection with a third network node of a second MNO, among the different MNOs, using the issued digital certificate and based on the trust relationship.

The first network node may be a radio unit (RU) of the first MNO, the second network node may be a distributed unit (DU) of the first MNO, and the third network node may be a DU of the second MNO.

The RU may be a 4G or 5G RU configured with a functional radio access network (RAN) split.

The RU may be an Open RAN (O-RAN) RU (O-RU), and the DU of the first MNO and the DU of the second MNO may be O-RAN DUS (O-DUS).

The first network node may be a base station of the first MNO, the second network node may be a core network node of the first MNO, and the third network node may be a core network node of the second MNO.

The receiving the digital certificate may include receiving the digital certificate in accordance with EST protocol or Certificate Management Protocol.

The receiving the digital certificate may include: transmitting a certificate signing request (CSR) to the PKI service provider; and receiving the digital certificate based on the transmitted CSR.

In accordance with an aspect of an example embodiment, a non-transitory computer-readable recording medium has recorded thereon instructions executable by at least one processor of a first network node to perform a method of providing secure connections with a plurality of network nodes of different mobile network operators (MNOs), the method including: receiving, by the first network node of a first MNO among the different MNOs, a digital certificate issued to the first network node from a public key infrastructure (PKI) service provider, the PKI service provider having a trust relationship with the different MNOs; establishing, by the first network node, a secure connection with a second network node of the first MNO using the issued digital certificate and based on the trust relationship; and establishing, by the first network node, a secure connection with a third network node of a second MNO, among the different MNOs, using the issued digital certificate and based on the trust relationship.

The first network node may be a radio unit (RU) of the first MNO, the second network node may be a distributed unit (DU) of the first MNO, and the third network node may be a DU of the second MNO.

The RU may be a 4G or 5G RU configured with a functional radio access network (RAN) split.

The RU may be an Open RAN (O-RAN) RU (O-RU), and the DU of the first MNO and the DU of the second MNO may be O-RAN DUS (O-DUs).

The first network node may be a base station of the first MNO, the second network node may be a core network node of the first MNO, and the third network node may be a core network node of the second MNO.

The receiving the digital certificate may include receiving the digital certificate in accordance with EST protocol or Certificate Management Protocol.

Additional aspects will be set forth in part in the description that follows and, in part, will be apparent from the description, or may be realized by practice of the presented embodiments of the disclosure.

BRIEF DESCRIPTION OF THE DRAWINGS

Features of exemplary embodiments of the disclosure will be described below with reference to the accompanying drawings, in which like reference numerals denote like elements, and wherein:

FIG. 5 is a block diagram illustrating a RAN sharing use case for a MORAN, according to another embodiment;

DETAILED DESCRIPTION

Figure 1:
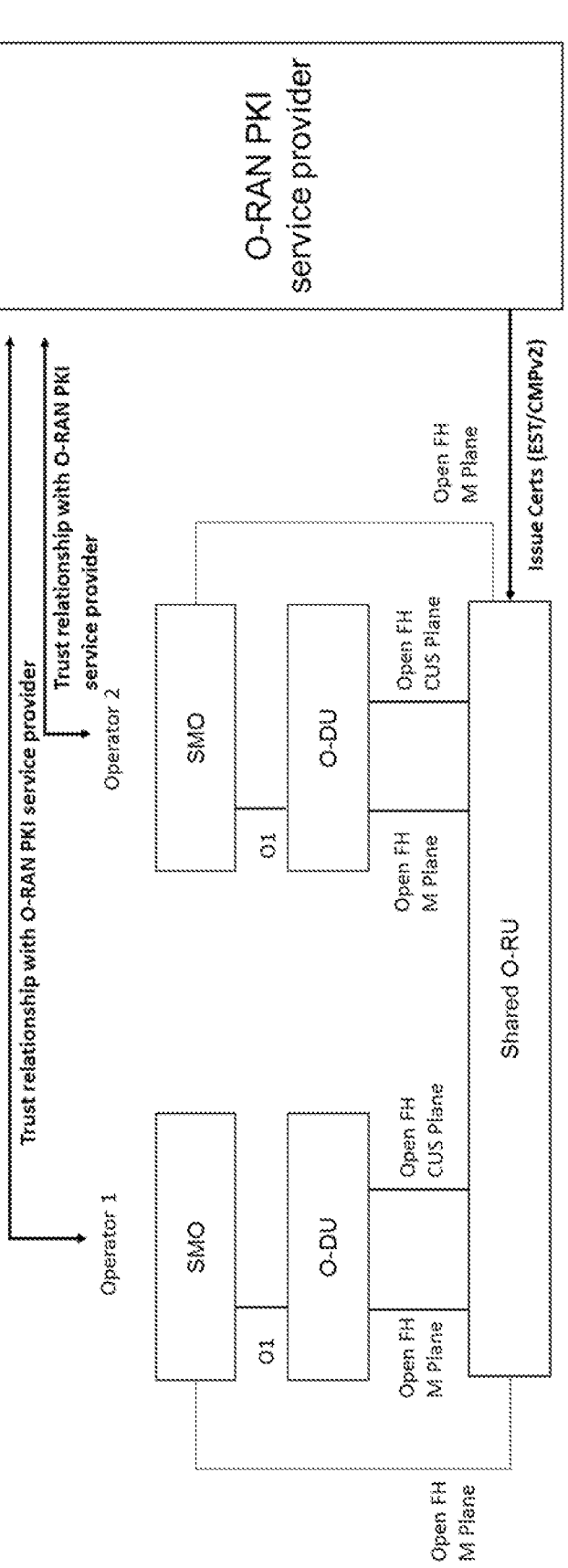
FIG. 1 is a block diagram illustrating a Radio Access Network (RAN) sharing use case for a Multi operator Radio Access Network (MORAN), according to an embodiment.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and system in which a trust exchange is established with multiple Mobile Network Operators (MNOs) sharing a common O-RU and certificate management is provided for the common O-RU. As a result, secure communication can be provided for MNOs sharing an O-RU, thereby allowing the MNOs to obtain the benefits of shared O-RU (such as, for example, expanded mobile network coverage at lower cost).

Further, example embodiments provide an O-RAN PKI service provider to manage certificate enrollment, wherein multiple MNOs have an established trust relationship with the O-RAN PKI service provider. As a result, MNOs can authenticate a shared O-RU using certificates issued by the O-RAN PKI service provider, and can expand their network coverage (e.g., to rural areas) with reduced cost. In some example embodiments, the O-RAN PKI service provider can service a single operator in the context of multiple O-DUs to one O-RU use cases, to obtain the benefit of simpler certificate enrollment.

FIG. 1 is a block diagram illustrating a Radio Access Network (RAN) sharing use case for a Multi operator Radio Access Network (MORAN), according to an embodiment. Referring to FIG. 1, an O-RAN PKI service provider establishes a trust relationship with multiple operators, and issues certificates to a shared O-RU. The O-RAN PKI service provider may be any publicly available certificate authority (CA). The multiple operators (Operator 1 and Operator 2) sharing the O-RU trust the certificate issued by the O-RAN PKI service provider as the multiple operators have already established a trust relationship with the O-RAN PKI service provider.

In accordance with one or more embodiments, the O-RAN PKI service provider meets all the technical requirements of the MNOs' networks, such as O-RAN accepted cryptography standards, enrollment mechanisms such as Certificate Management Protocol (CMP), EST/ACME, Open fronthaul flows for certificate enrollment, etc., in addition to the shared trust between two or more O-RAN operators or Shared O-RAN operator (SORO).

Figure 2:
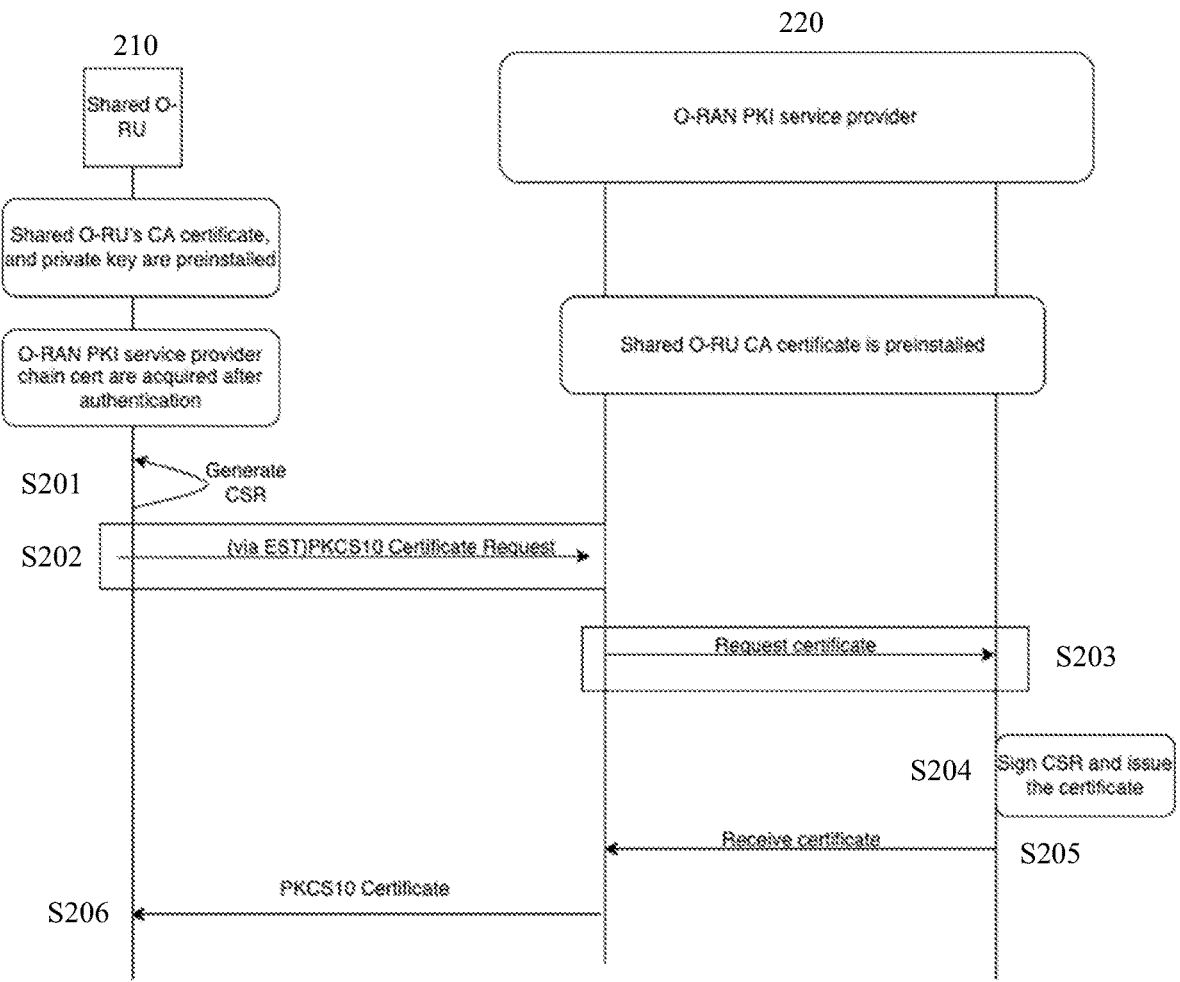
FIG. 2 is a flow diagram of a method of enrolling a certificate for a shared O-RU, according to an embodiment.

FIG. 2 is a flow diagram of a method of enrolling a certificate for a shared O-RU 210, according to an embodiment. For example, the method shown in FIG. 2 may be applied to the certificate enrollment of the shared O-RU shown in FIG. 1. It is understood that while an O-RU is exemplified as the shared network element and the network element for which a certificate is issued by the PKI service provider, one or more other embodiments are not limited thereto and may be applied to other types of network elements.

Referring to FIG. 2, the shared O-RU 210 has installed therein a private key and a shared O-RU's certificate authority (CA) certificate (e.g., a certificate issued by the O-RU's vendor CA or the O-RU operator's (i.e., the MNO that owns the O-RU) CA). The O-RAN PKI service provider 220 in accordance with example embodiments also has installed therein the shared O-RU's CA certificate.

At operation S201, the shared O-RU 210 generates a certificate signing request (CSR). For example, the CSR may be formatted in accordance with a predefined standard, such as Public Key Cryptography Standards (PKCS) 10.

At operations S202 and S203, the shared O-RU 210 transmits the CSR to the O-RAN PKI service provider 220. To this end, the certificate request may be pursuant to a predefined protocol, such as Enrollment over Secure Transport (EST) protocol (i.e., as defined in RFC 7030), Simple Certificate Enrollment Protocol (SCEP), Certificate Management Protocol (CMP), Certificate Management over Cryptographic Message Syntax (CMC), etc.

At operation S204, upon successful authentication (e.g., using the shared O-RU's CA certificate), the O-RAN PKI service provider 220 issues a certificate. At operations S205 and S206, the certificate is transmitted to the shared O-RU 210.

Figure 3:
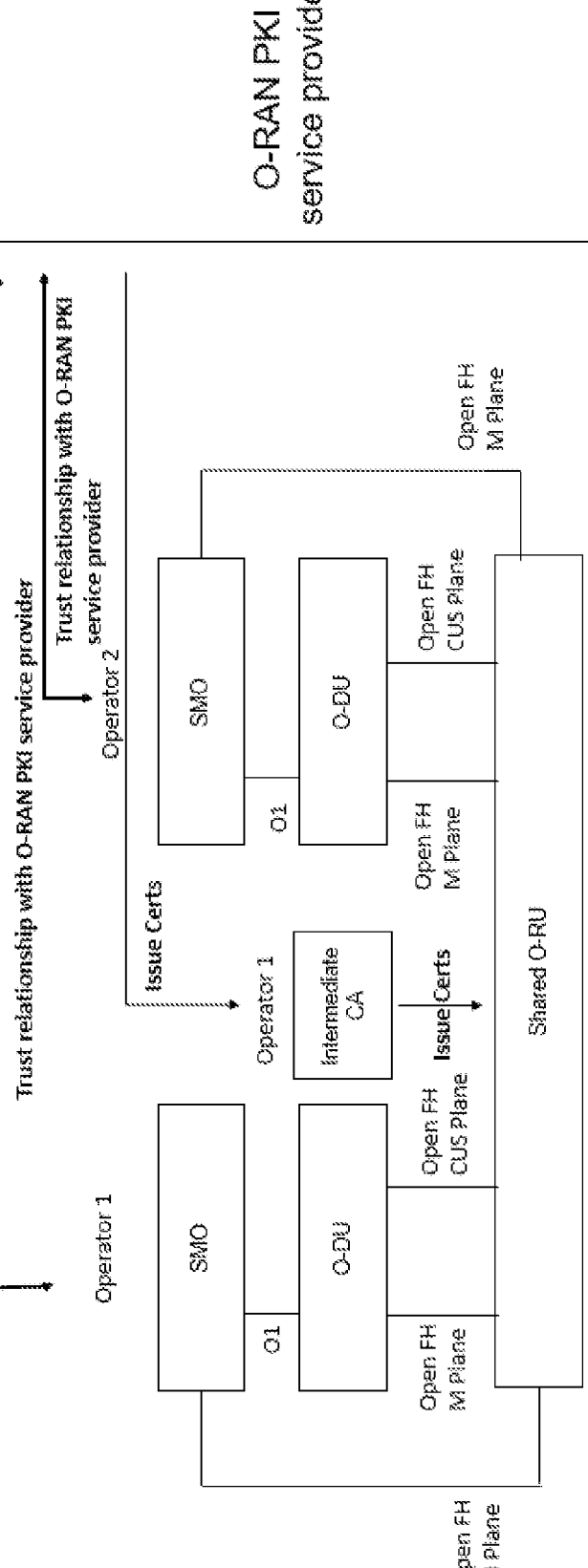
FIG. 3 is a block diagram illustrating a RAN sharing use case for a MORAN, according to another embodiment.

FIG. 3 is a block diagram illustrating a RAN sharing use case for a MORAN, according to another embodiment. Referring to FIG. 3, the O-RAN PKI service provider establishes a trust relationship with multiple operators, and issues certificates to an intermediate CA of one of the operators. The O-RAN PKI service provider may be any publicly available certificate authority (CA). In the embodiment of FIG. 3, the shared O-RU enrolls with Operator 1's intermediate CA, and the O-RAN PKI service provider is the root CA for the shared O-RU. The multiple operators (Operator 1 and Operator 2) sharing the O-RU trust the certificate issued by the intermediate CA as the multiple operators have already established a trust relationship with the root CA, i.e., the O-RAN PKI service provider, and therefore trust the root certificate.

Figure 4:
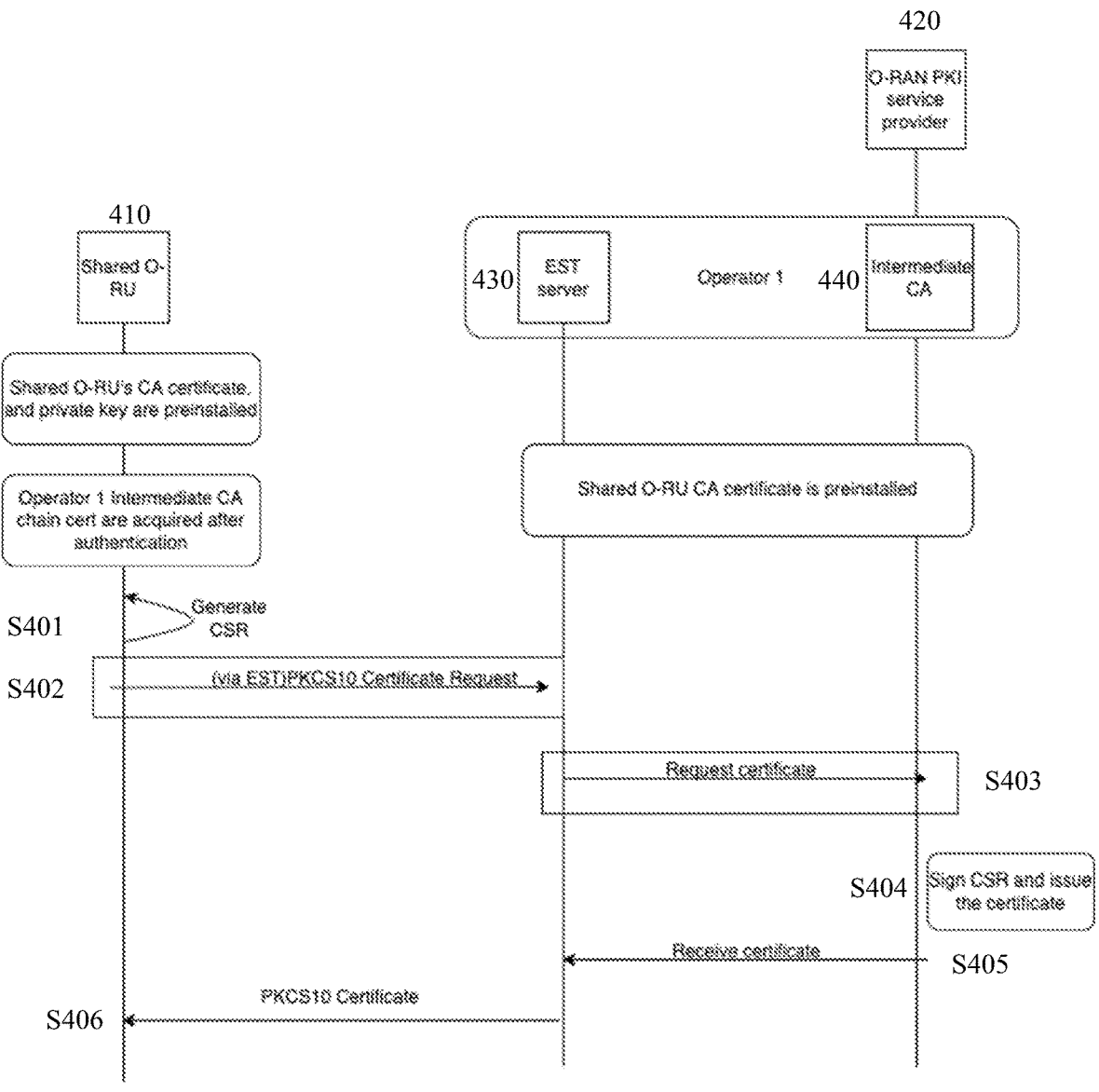
FIG. 4 is a flow diagram of a method of enrolling a certificate for a shared O-RU, according to another embodiment.

FIG. 4 is a flow diagram of a method of enrolling a certificate for a shared O-RU, according to another embodiment. For example, the method shown in FIG. 4 may be applied to the certificate enrollment of the shared O-RU shown in FIG. 3. It is understood that while an O-RU is exemplified as the shared network element and the network element for which a certificate is issued by the PKI service provider, one or more other embodiments are not limited thereto and may be applied to other types of network elements.

Referring to FIG. 4, the shared O-RU 410 has installed therein a private key and a shared O-RU's certificate authority (CA) certificate (e.g., a certificate issued by the O-RU's vendor CA or the O-RU operator's (i.e., the MNO that owns the O-RU) CA). Operator 1's certificate authority (e.g., EST server 430 and/or intermediate CA 440) also has installed therein the shared O-RU's CA certificate. The shared O-RU 410 acquires Operator 1's intermediate CA chain certificate after authentication.

Specifically, at operation S401, the shared O-RU 410 generates a certificate signing request (CSR). For example, the CSR may be formatted in accordance with a predefined standard, such as Public Key Cryptography Standards (PKCS) 10.

At operations S402 and S403, the shared O-RU 410 transmits the CSR to Operator 1's certificate authority. To this end, the certificate request may be pursuant to a predefined protocol, such as Enrollment over Secure Transport (EST) protocol (i.e., as defined in RFC 7030), though other embodiments are not limited thereto and may apply other protocols (e.g., Simple Certificate Enrollment Protocol (SCEP), Certificate Management Protocol (CMP), Certificate Management over Cryptographic Message Syntax (CMC), etc.).

At operation S404, upon successful authentication (e.g., using the shared O-RU's CA certificate), the intermediate CA 440 issues a certificate. At operations S405 and S406, the certificate is transmitted to the shared O-RU 410.

Figure 5:
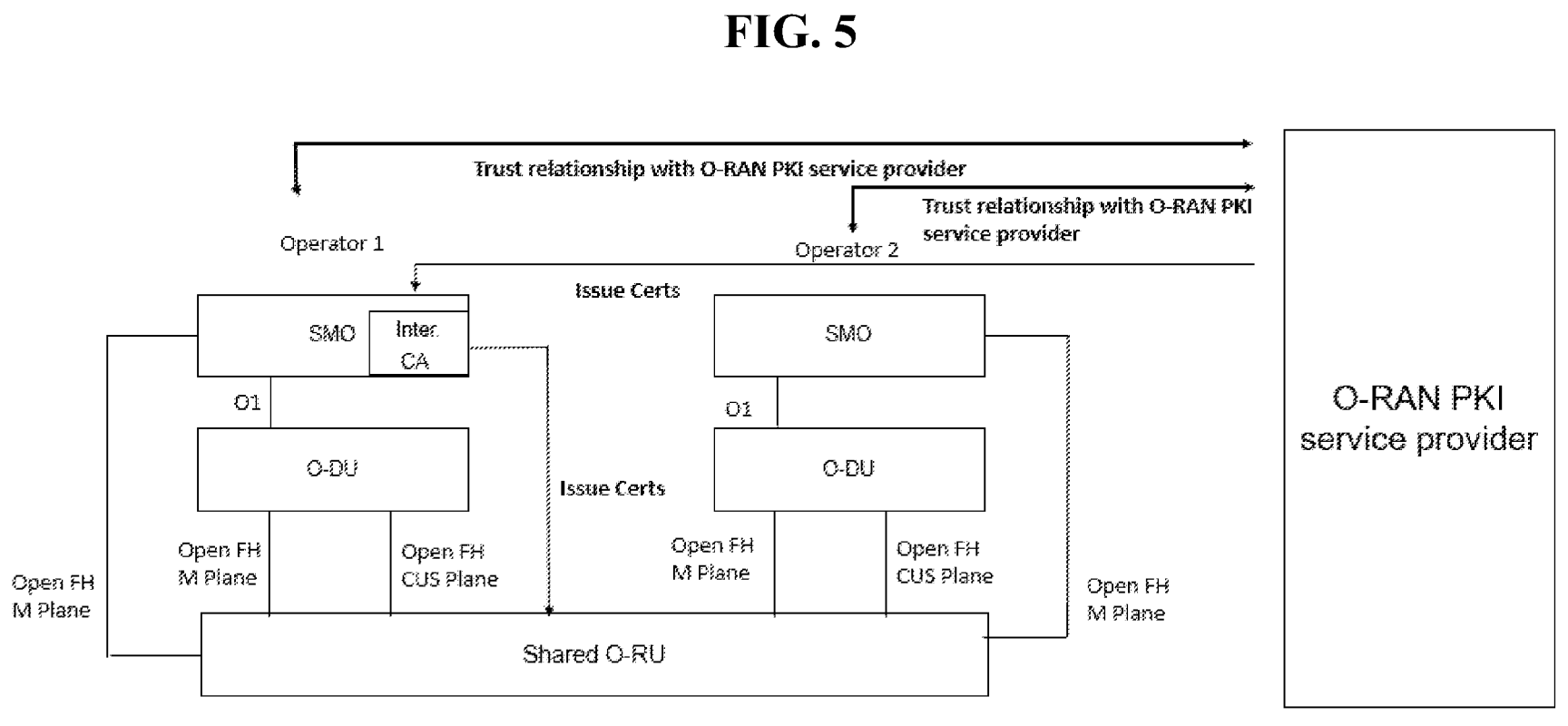

FIG. 5 is a block diagram illustrating a RAN sharing use case for a MORAN, according to another embodiment. Referring to FIG. 5, the O-RAN PKI service provider establishes a trust relationship with multiple operators, and issues certificates to an intermediate CA of one of the operators. The O-RAN PKI service provider may be any publicly available certificate authority (CA). In the embodiment of FIG. 5, the shared O-RU enrolls with Operator 1's intermediate CA via Operator 1's Service Management and Orchestration (SMO) platform, which is a trust anchor. The O-RAN PKI service provider is the root CA for the shared O-RU, and the SMO enrolls with the external O-RAN PKI service provider. The multiple operators (Operator 1 and Operator 2) sharing the O-RU trust the certificate issued by the intermediate CA as the multiple operators have already established a trust relationship with the root CA, i.e., the O-RAN PKI service provider, and therefore trust the root certificate.

Figure 6:
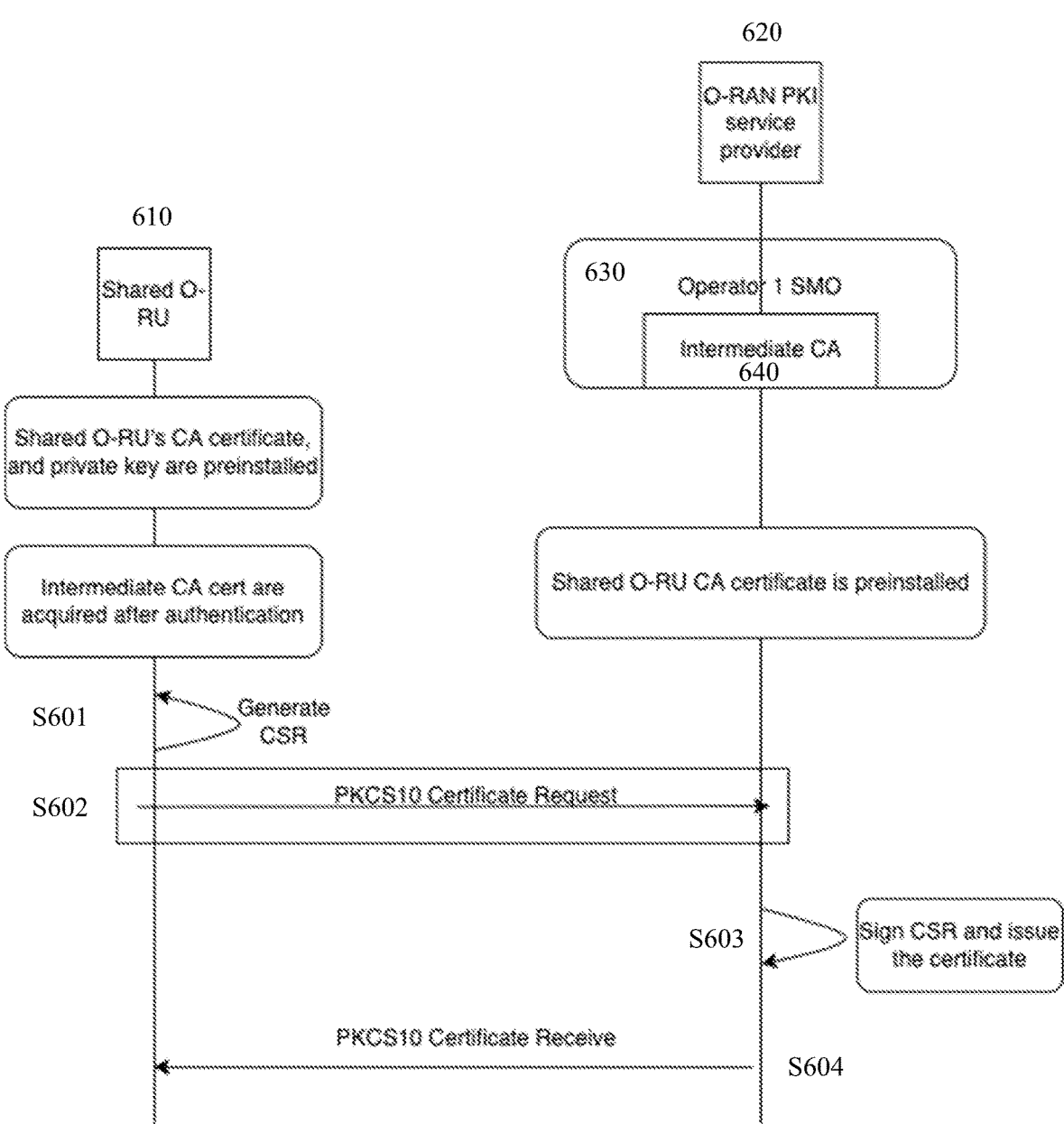
FIG. 6 is a flow diagram of a method of enrolling a certificate for a shared O-RU, according to another embodiment.

FIG. 6 is a flow diagram of a method of enrolling a certificate for a shared O-RU, according to another embodiment. For example, the method shown in FIG. 6 may be applied to the certificate enrollment of the shared O-RU shown in FIG. 5. It is understood that while an O-RU is exemplified as the shared network element and the network element for which a certificate is issued by the PKI service provider, one or more other embodiments are not limited thereto and may be applied to other types of network elements.

Referring to FIG. 6, the shared O-RU 610 has installed therein a private key and a shared O-RU's certificate authority (CA) certificate (e.g., a certificate issued by the O-RU's vendor CA or the O-RU operator's (i.e., the MNO that owns the O-RU) CA). Operator 1's certificate authority (e.g., intermediate CA 640 in Operator 1's SMO 630) also has installed therein the shared O-RU's CA certificate. The shared O-RU 610 acquires Operator 1's intermediate CA certificate after authentication.

Specifically, at operation S601, the shared O-RU 610 generates a certificate signing request (CSR). For example, the CSR may be formatted in accordance with a predefined standard, such as Public Key Cryptography Standards (PKCS) 10.

At operation S602, the shared O-RU 610 transmits the CSR to Operator 1's certificate authority. To this end, the certificate request may be pursuant to a predefined protocol, such as EST, Simple Certificate Enrollment Protocol (SCEP), Certificate Management Protocol (CMP), Certificate Management over Cryptographic Message Syntax (CMC), etc.

At operation S603, upon successful authentication (e.g., using the shared O-RU's CA certificate), the intermediate CA 640 issues a certificate. At operation S604, the certificate is transmitted to the shared O-RU 610.

Figure 7:
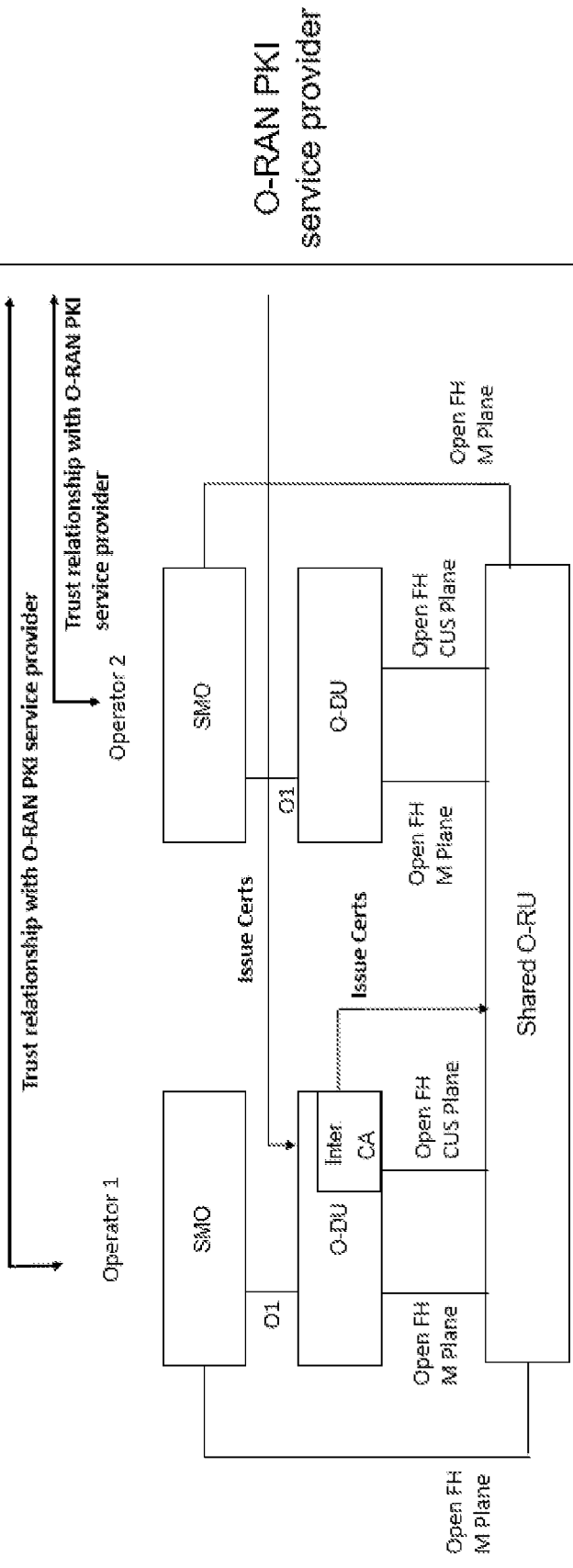
FIG. 7 is a block diagram illustrating a RAN sharing use case for a MORAN, according to another embodiment.

FIG. 7 is a block diagram illustrating a RAN sharing use case for a MORAN, according to another embodiment. Referring to FIG. 7, the O-RAN PKI service provider establishes a trust relationship with multiple operators, and issues certificates to an intermediate CA of one of the operators. The O-RAN PKI service provider may be any publicly available certificate authority (CA). In the embodiment of FIG. 7, the shared O-RU enrolls with Operator 1's intermediate CA via Operator 1's O-DU, which is a trust anchor. The O-RAN PKI service provider is the root CA for the shared O-RU, and the O-DU enrolls with the external O-RAN PKI service provider. The multiple operators (Operator 1 and Operator 2) sharing the O-RU trust the certificate issued by the intermediate CA as the multiple operators have already established a trust relationship with the root CA, i.e., the O-RAN PKI service provider, and therefore trust the root certificate.

Figure 8:
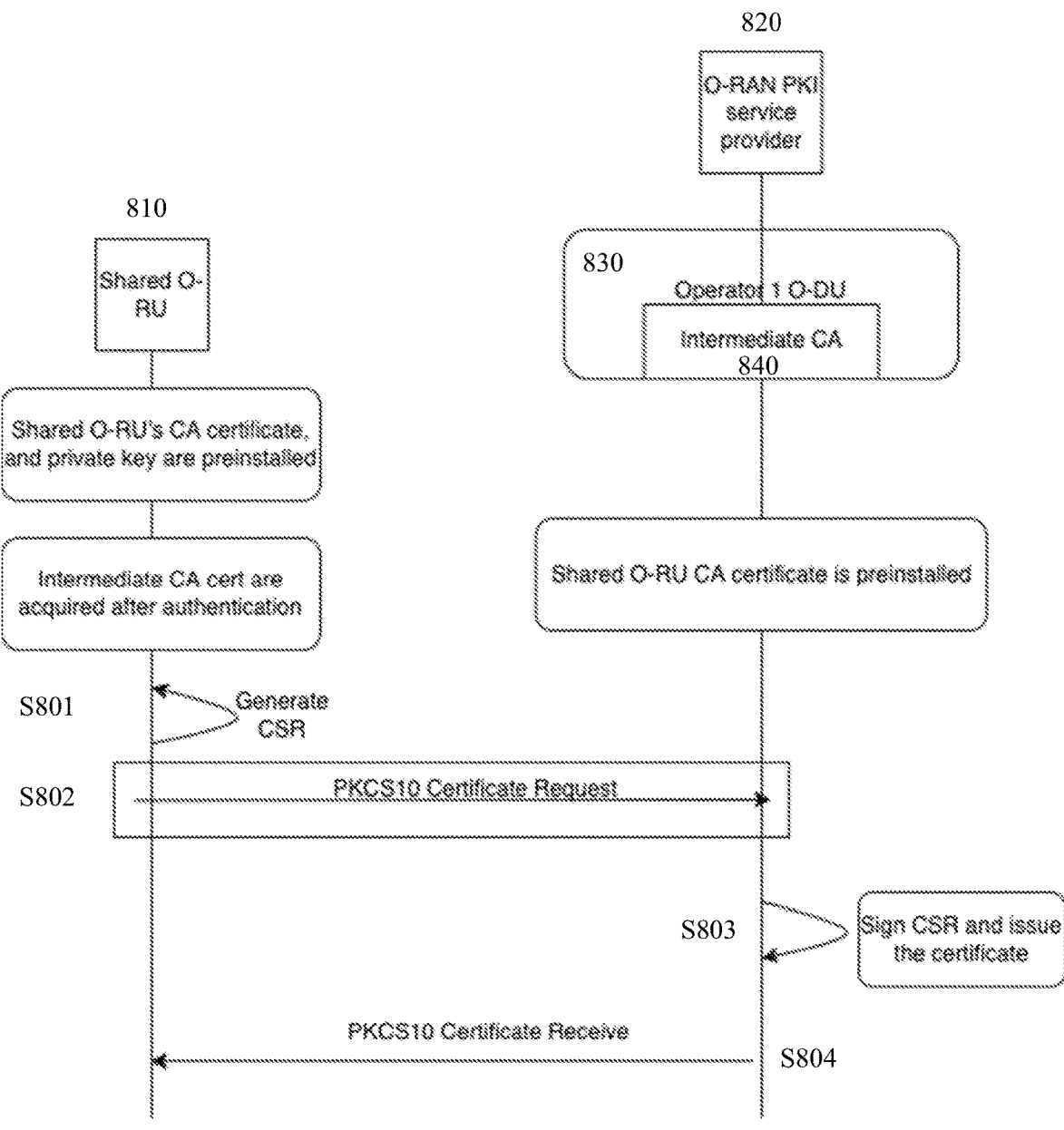
FIG. 8 is a flow diagram of a method of enrolling a certificate for a shared O-RU, according to another embodiment.

FIG. 8 is a flow diagram of a method of enrolling a certificate for a shared O-RU, according to another embodiment. For example, the method shown in FIG. 8 may be applied to the certificate enrollment of the shared O-RU shown in FIG. 7. It is understood that while an O-RU is exemplified as the shared network element and the network element for which a certificate is issued by the PKI service provider, one or more other embodiments are not limited thereto and may be applied to other types of network elements.

Referring to FIG. 8, the shared O-RU 810 has installed therein a private key and a shared O-RU's certificate authority (CA) certificate (e.g., a certificate issued by the O-RU's vendor CA or the O-RU operator's (i.e., the MNO that owns the O-RU) CA). Operator 1's certificate authority (e.g., intermediate CA 840 in Operator 1's O-DU 830) also has installed therein the shared O-RU's CA certificate. The shared O-RU 810 acquires Operator 1's intermediate CA certificate after authentication.

Specifically, at operation S801, the shared O-RU 810 generates a certificate signing request (CSR). For example, the CSR may be formatted in accordance with a predefined standard, such as Public Key Cryptography Standards (PKCS) 10.

At operation S802, the shared O-RU 810 transmits the CSR to Operator 1's certificate authority. To this end, the certificate request may be pursuant to a predefined protocol, such as EST, Simple Certificate Enrollment Protocol (SCEP), Certificate Management Protocol (CMP), Certificate Management over Cryptographic Message Syntax (CMC), etc.

At operation S803, upon successful authentication (e.g., using the shared O-RU's CA certificate), the intermediate CA 840 issues a certificate. At operation S804, the certificate is transmitted to the shared O-RU 810.

Figure 9:
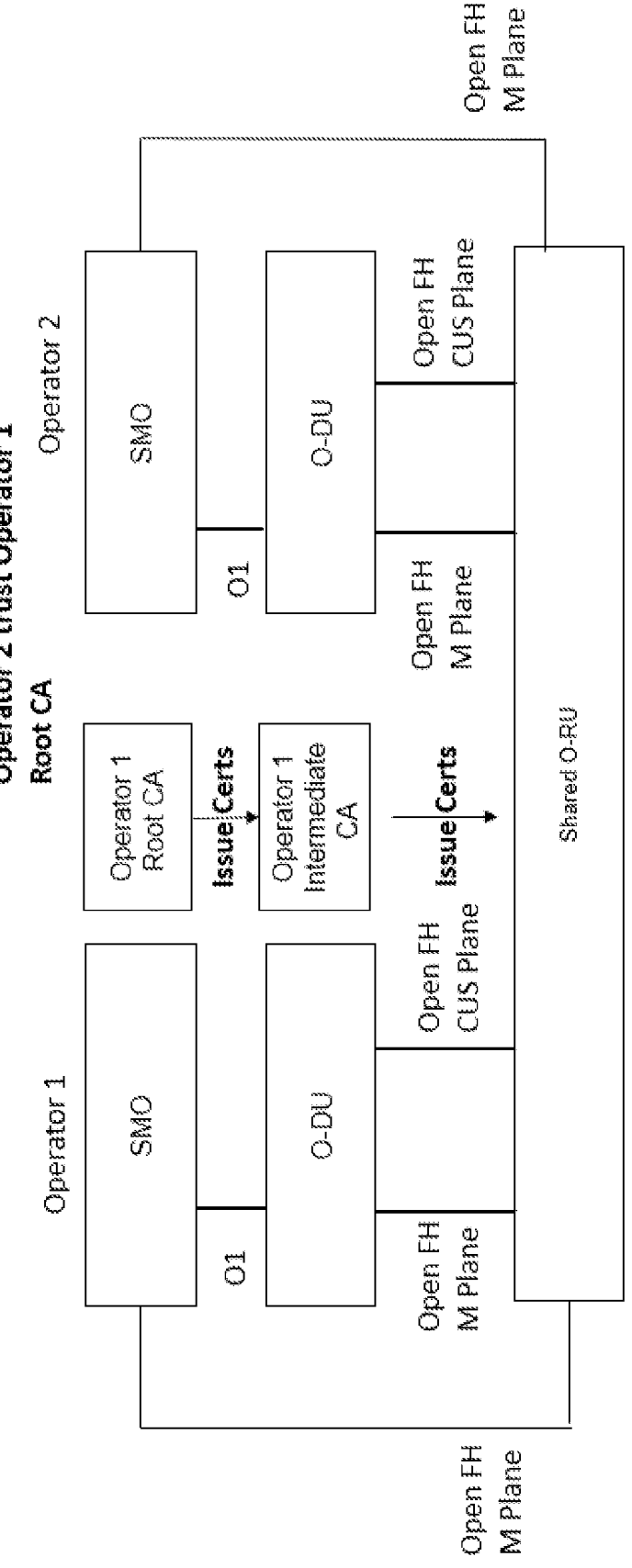
FIG. 9 is a block diagram illustrating a RAN sharing use case for a MORAN, according to another embodiment.

FIG. 9 is a block diagram illustrating a RAN sharing use case for a MORAN, according to another embodiment. Referring to FIG. 9, a second Operator (Operator 2) has an established trust relationship with an root CA of a first Operator (Operator 1). As a result, the shared O-RU can enroll with Operator 1's intermediate CA, which enrolls with Operator 1's root CA.

Figure 10:
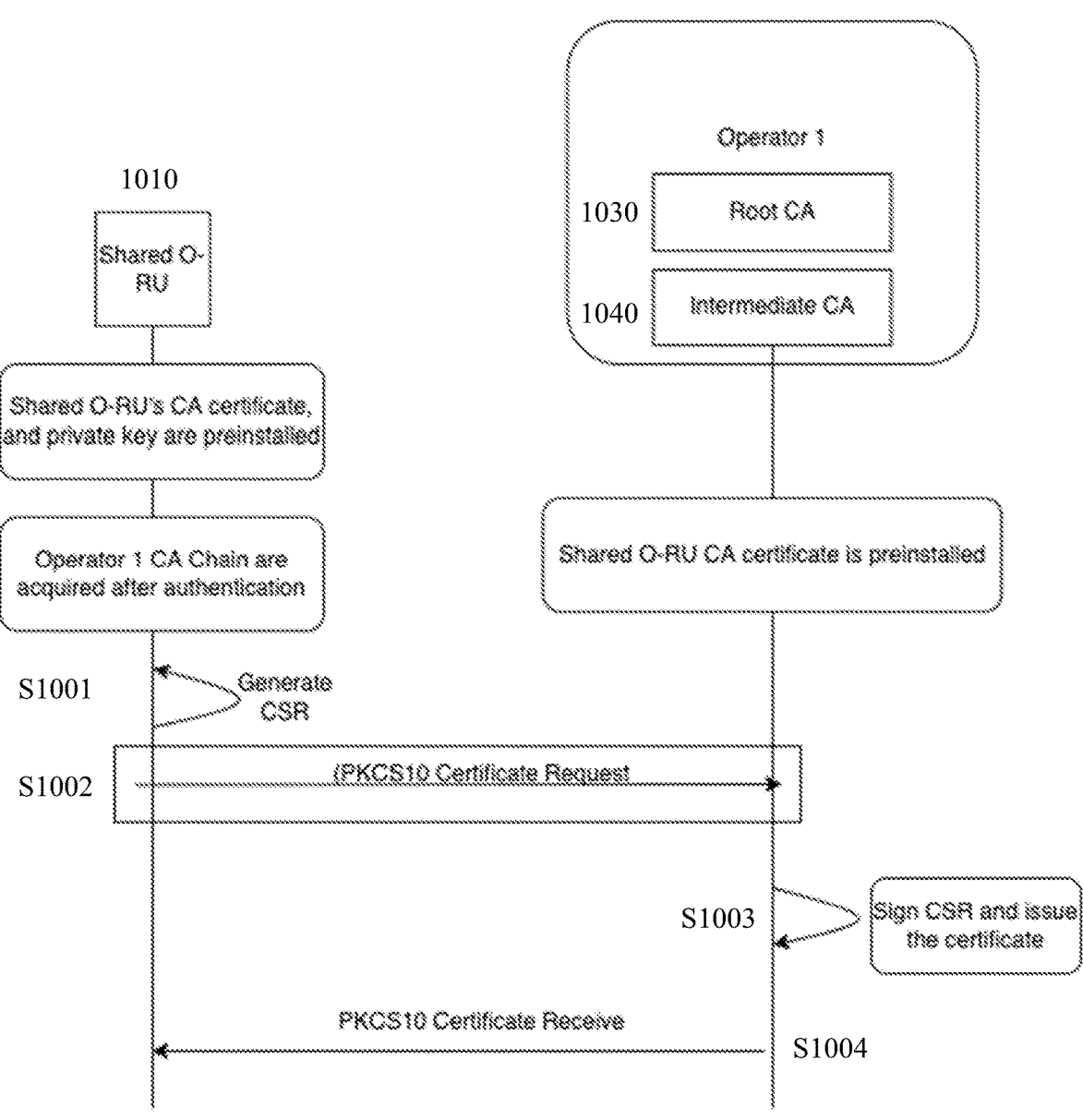
FIG. 10 is a flow diagram of a method of enrolling a certificate for a shared O-RU, according to another embodiment.

FIG. 10 is a flow diagram of a method of enrolling a certificate for a shared O-RU, according to another embodiment. For example, the method shown in FIG. 10 may be applied to the certificate enrollment of the shared O-RU shown in FIG. 9. It is understood that while an O-RU is exemplified as the shared network element and the network element for which a certificate is issued by the PKI service provider, one or more other embodiments are not limited thereto and may be applied to other types of network elements.

Referring to FIG. 10, the shared O-RU 1010 has installed therein a private key and a shared O-RU's certificate authority (CA) certificate (e.g., a certificate issued by the O-RU's vendor CA or the O-RU operator's (i.e., the MNO that owns the O-RU) CA). Operator 1's certificate authority (e.g., intermediate CA 1040 that enrolls certificate with Operator 1's root CA 1030) also has installed therein the shared O-RU's CA certificate. The shared O-RU 1010 acquires Operator 1's intermediate CA certificate after authentication.

Specifically, at operation S1001, the shared O-RU 810 generates a certificate signing request (CSR). For example, the CSR may be formatted in accordance with a predefined standard, such as Public Key Cryptography Standards (PKCS) 10.

At operation S1002, the shared O-RU 1010 transmits the CSR to Operator 1's certificate authority. To this end, the certificate request may be pursuant to a predefined protocol, such as EST, Simple Certificate Enrollment Protocol (SCEP), Certificate Management Protocol (CMP), Certificate Management over Cryptographic Message Syntax (CMC), etc.

At operation S1003, upon successful authentication (e.g., using the shared O-RU's CA certificate), the intermediate CA 1040 issues a certificate. At operation S1004, the certificate is transmitted to the shared O-RU 1010.

Figure 11:
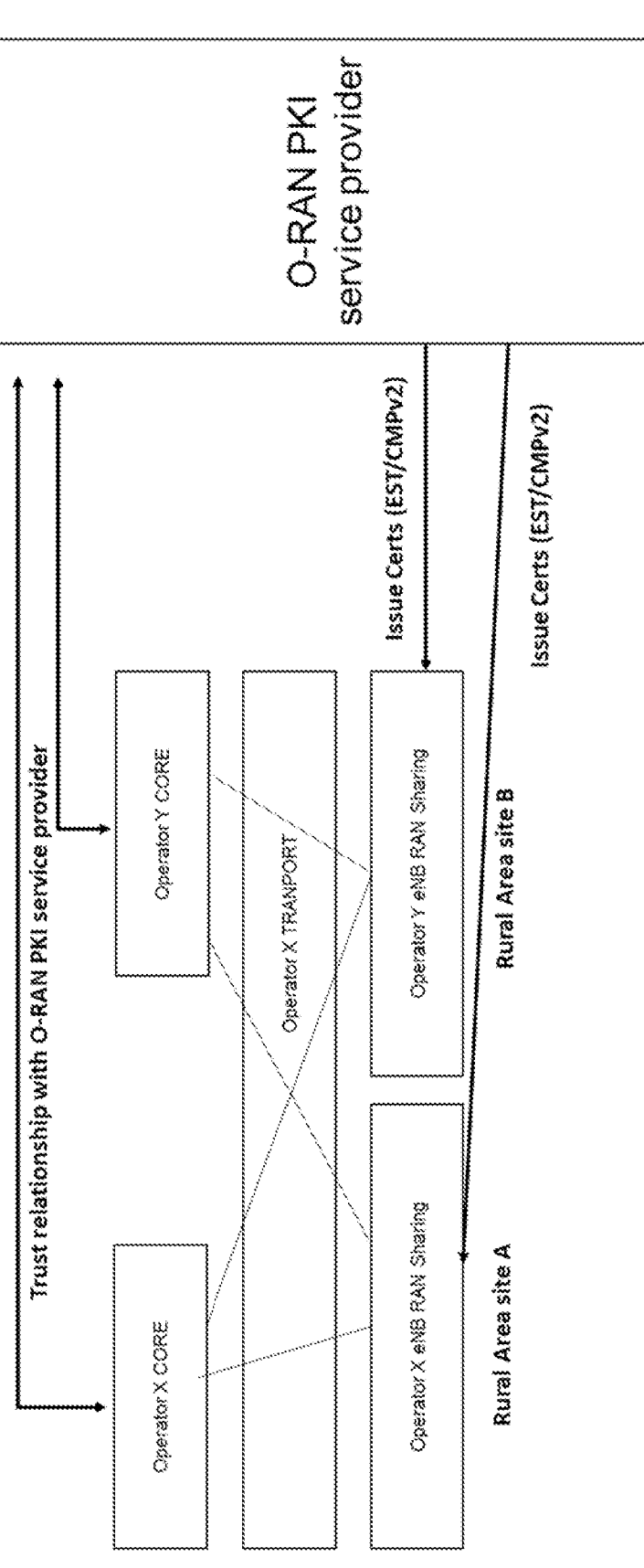
FIG. 11 is a block diagram illustrating a RAN sharing use case for a rural area, according to an embodiment.

FIG. 11 is a block diagram illustrating a RAN sharing use case for a rural area, according to an embodiment. The embodiment of FIG. 11 is directed to a non-split 4G eNB architecture, though it is understood that one or more other embodiments are not limited thereto, and may be applied to a non-split 5G architecture, O-RAN architecture, etc.

Referring to FIG. 11, a 4G base station (eNB) located at rural area site A and owned by Operator X and a 4G eNB located at rural site B and owned by Operator Y are both provisioned with certificates from the O-RAN PKI service provider in accordance with one or more embodiments. As above, both Operators have an established trust relationship with the O-RAN PKI service provider. Accordingly, secure connections between each eNB and both Operators can be established using the O-RAN PKI service provider's issued certificates. Thus, Operator X's eNB can be shared by both Operator X and Operator Y (i.e., connect to Operator X's core network and Operator Y's core network), and Operator Y's eNB can be shared by both Operator X and Operator Y (i.e., connect to Operator X's core network and Operator Y's core network). As a result, Operator Y can provide its subscribers access and connectivity in rural area site A without needing to deploy its own base station, thus saving resources and money and expanding its network coverage. Similarly, Operator X can provide its subscribers access and connectivity in rural area site B with similar benefits.

Figure 12:
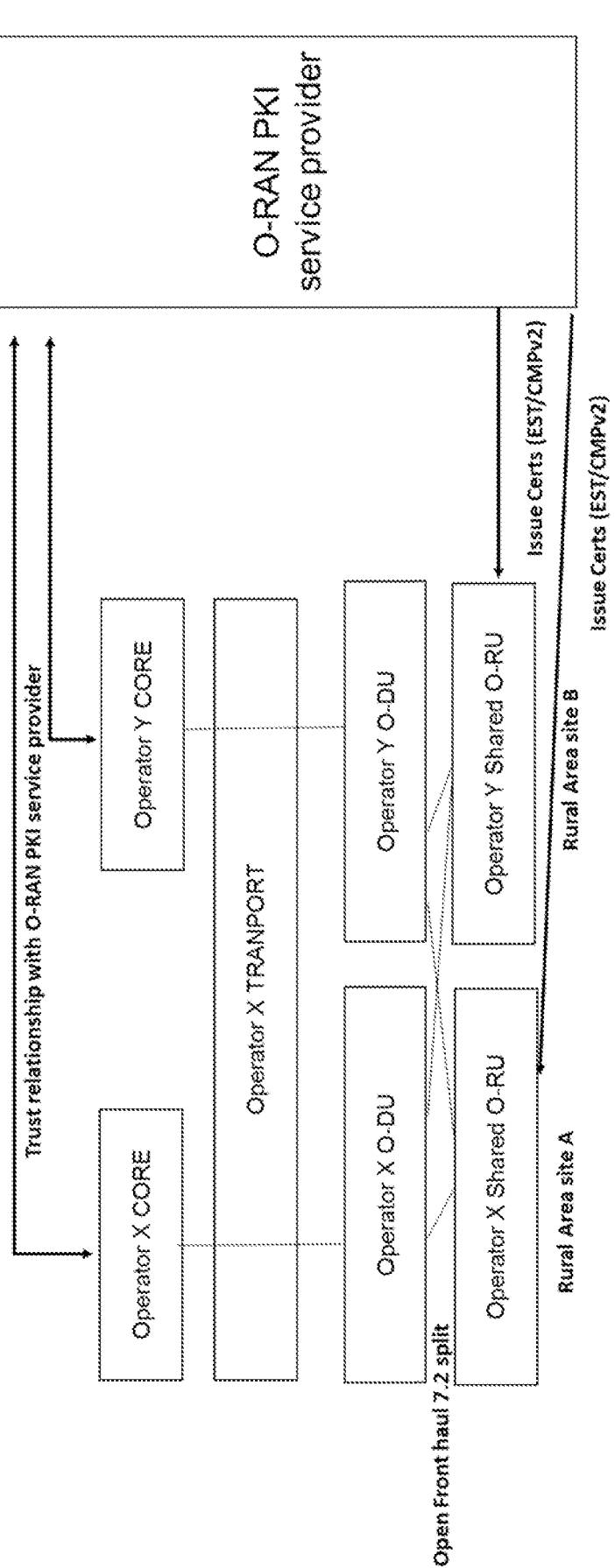
FIG. 12 is a block diagram illustrating a RAN sharing use case for a rural area, according to another embodiment.

FIG. 12 is a block diagram illustrating a RAN sharing use case for a rural area, according to another embodiment. The embodiment of FIG. 12 is directed to a split 4G eNB and/or 5G gNB architecture. For example, the base stations may be configured with functional split option 7.2x, though this is merely an example and one or more other example embodiments are not limited thereto.

Referring to FIG. 12, an O-RU (4G or 5G) located at rural area site A and owned by Operator X and an O-RU (4G or 5G) located at rural site B and owned by Operator Y are both provisioned with certificates from the O-RAN PKI service provider in accordance with one or more embodiments. As above, both Operators have an established trust relationship with the O-RAN PKI service provider. Accordingly, secure connections between each O-RU and both Operators can be established using the O-RAN PKI service provider's issued certificates. Thus, Operator X's O-RU can be shared by both Operator X and Operator Y (i.e., connect to Operator X's O-DU and Operator Y's O-DU), and Operator Y's O-RU can be shared by both Operator X and Operator Y (i.e., connect to Operator X's O-DU and Operator Y's O-DU). As a result, Operator Y can provide its subscribers access and connectivity in rural area site A without needing to deploy its own base station or radio unit, thus saving resources and money and expanding its network coverage. Similarly, Operator X can provide its subscribers access and connectivity in rural area site B with similar benefits.

Figure 13:
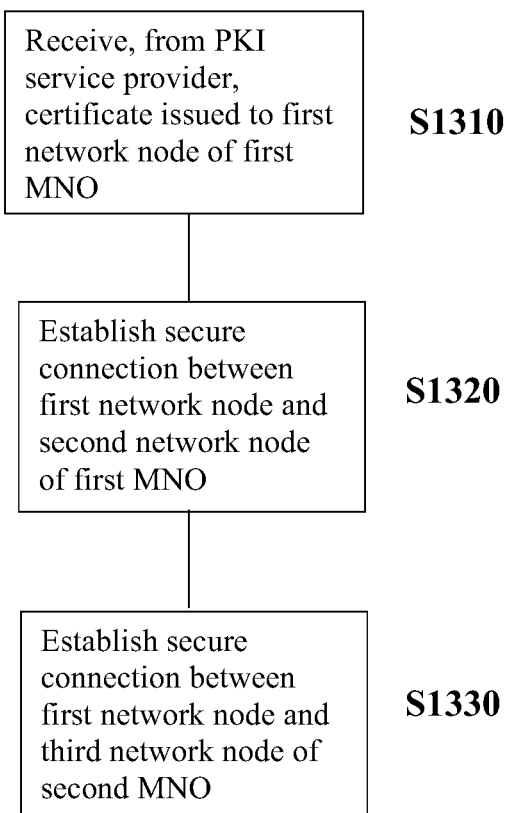
FIG. 13 illustrates a flowchart of a method of establishing a secure connection between a common radio unit (RU) and a plurality of distributed units that share the common RU, according to one or more embodiments.

FIG. 13 illustrates a flowchart of a method of establishing a secure connection between a common RU and a plurality of DUs that share the common RU, according to one or more embodiments. In accordance with one or more embodiments, the RU and the plurality of DUs may be based on O-RAN technology (i.e., O-RU and O-DUs) and may be connected via O-RAN open fronthaul interfaces and specifications, though it is understood that one or more other embodiments are not limited thereto. For example, one or more other embodiments may share a network element such as a base station, without a functional split (i.e., split architecture).

Referring to FIG. 13, in operation S1310, the RU of a first mobile network operator (MNO) receives a certificate issued to the RU from a PKI service provider in accordance with example embodiments. The PKI server has an established trust relationship with a plurality of MNOs, including the first MNO. For example, nodes (e.g., O-DUs) of the plurality of MNOs may have stored therein a root certificate of the PKI service provider or otherwise established or registered the PKI service provider as a trusted entity. The O-RU may request and enroll the certificate in accordance with a particular protocol, such as Enrollment over Secure Transport (EST) protocol (i.e., as defined in RFC 7030), Simple Certificate Enrollment Protocol (SCEP), CMP, Certificate Management over Cryptographic Message Syntax (CMC), etc. Further, the O-RU may generate and submit a certificate signing request (CSR) and the PKI service provider may issue the certificate based on the CSR. The certificate may be formatted in accordance with a predefined standard, such as X.509.

In operation S1320, the RU establishes a secure connection with a DU of the first MNO using the issued certificate and based on the established trust between the second MNO and the PKI service provider. For example, the RU may be authenticated by the DU of the first MNO by transmitting its certificate in accordance with an authentication procedure (e.g., predefined authentication procedure).

In operation S1330, the RU establishes a secure connection with a DU of a second MNO, among the plurality of MNOs, using the issued certificate and based on the established trust between the second MNO and the PKI service provider. For example, the RU may be authenticated by the DU of the second MNO by transmitting its certificate in accordance with an authentication procedures (e.g., predefined authentication procedure).

Because there is a trust relationship between the PKI service provider (e.g., certificate authority) and both MNOs, secure connections between the shared RU and both MNOs' DUs can be established using the certificates issued by the PKI service provider.

Figure 14:
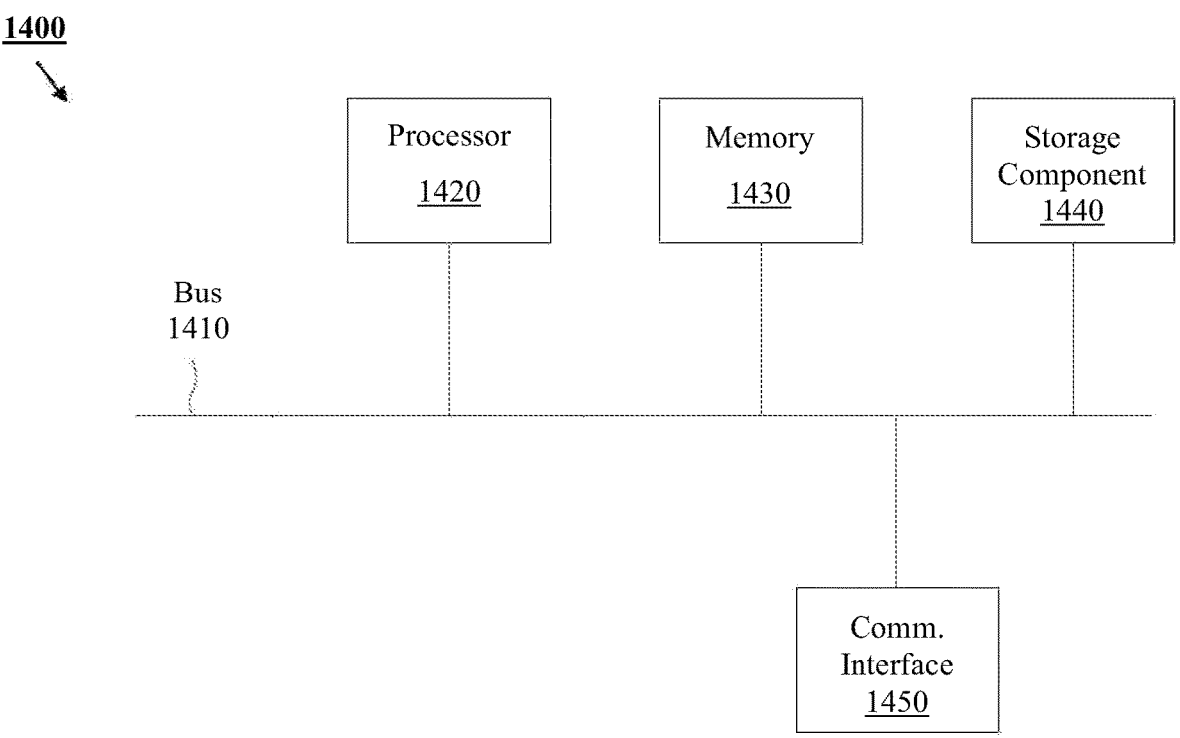
FIG. 14 is a diagram of components of one or more devices according to an example embodiment.

FIG. 14 is a diagram of components of one or more devices according to an example embodiment. Device 1400 may correspond to any of the devices described above (e.g., network element (RU, DU, gNB, eNB, core network element, CA, intermediate CA, PKI service provider, etc.).

Referring to FIG. 14, the device 1400 may include a bus 1410, a processor 1420, a memory 1430, a storage component 1440, and a communication interface 1450. It is understood that one or more of the components may be omitted and/or one or more additional components may be included.

The bus 1410 includes a component that permits communication among the components of the device 1400. The processor 1420 is implemented in hardware, firmware, or a combination of hardware and software. The processor 1420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor 1420 includes one or more processors capable of being programmed to perform a function.

The memory 1430 includes a random access memory (RAM), a read only memory (ROM), and/or another type of dynamic or static storage device (e.g., a flash memory, a magnetic memory, and/or an optical memory) that stores information and/or instructions for use by the processor 1420.

The storage component 1440 stores information and/or software related to the operation and use of the device 1400. For example, the storage component 1440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The communication interface 1450 includes a transceiver-like component (e.g., a transceiver and/or a separate receiver and transmitter) that enables the device 1400 to communicate with other devices, such as via a wired connection, a wireless connection, or a combination of wired and wireless connections. The communication interface 1450 may permit device 1400 to receive information from another device and/or provide information to another device. For example, the communication interface 1450 may include an Ethernet interface, an optical interface, a coaxial interface, an infrared interface, a radio frequency (RF) interface, a universal serial bus (USB) interface, a Wi-Fi interface, a cellular network interface, or the like.

The device 1400 may perform one or more processes or functions described herein. The device 1400 may perform operations based on the processor 1420 executing software instructions stored by a non-transitory computer-readable medium, such as the memory 1430 and/or the storage component 1440. A computer-readable medium is defined herein as a non-transitory memory device. A memory device includes memory space within a single physical storage device or memory space spread across multiple physical storage devices.

Software instructions may be read into the memory 1430 and/or the storage component 1440 from another computer-readable medium or from another device via the communication interface 1450. When executed, software instructions stored in the memory 1430 and/or storage component 1440 may cause the processor 1420 to perform one or more processes described herein.

While example embodiments described above relate to an O-RU as a shared network element, it is understood that one or more other embodiments are not limited thereto, and are applicable to any network element (e.g., eNB, gNB, transport elements, etc.) that can be shared among operators (i.e., shared by respective network elements (e.g., DUs, core network elements, etc.) of multiple operators).

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A first network node of a first mobile network operator (MNO), among a plurality of MNOs, the first network node comprising:

a memory storing instructions; and at least one processor configured to execute the instructions to:

transmit a certificate signing request (CSR) to a public key infrastructure (PKI) service provider;

in response to transmitting the CSR to the PKI service provider, receive a common digital certificate issued to the first network node and having a chain of trust to the PKI service provider indicating that the PKI service provider has a trust relationship with each of the plurality of MNOs;

establish, by the first network node, a secure connection with a second network node of the first MNO using the common digital certificate and based on the chain of trust indicating a trust relationship between the first MNO and the PKI service provider; and establish, by the first network node, a secure connection with a third network node of a second MNO, among the plurality of MNOs, using the issued common certificate and based on the chain of trust indicating a trust relationship between the second MNO and the PKI service provider, wherein the first network node is a radio unit (RU) of the first MNO, the second network node is a distributed unit (DU) of the first MNO, and the third network node is a DU of the second MNO.

2. The first network node as claimed in claim 1, wherein the at least one processor is configured to execute the instructions to:

transmit the CSR to an intermediate certificate authority (CA) of the first MNO; and in response to transmitting the CSR to the intermediate CA, receive the digital certificate from the intermediate CA.

3. The first network node as claimed in claim 2, wherein the intermediate CA is located within a Service Management and Orchestration (SMO) platform of the first MNO or an O-DU of the first MNO.

4. The first network node as claimed in claim 1, wherein the RU is a 4G or 5G RU configured with a functional radio access network (RAN) split.

5. The first network node as claimed in claim 1, wherein the RU is an Open RAN (O-RAN) RU (O-RU), and the DU of the first MNO and the DU of the second MNO are O-RAN DUS (O-DUs).

6. A method of providing secure connections between a shared network node and a plurality of network nodes of different mobile network operators (MNOs), the method comprising:

transmitting, by a first network node of a first MNO among the different MNOs, a certificate signing request (CSR) to a public key infrastructure (PKI) service provider;

in response to transmitting the CSR to the PKI service provider, receiving, by the first network node, a digital certificate issued to the first network node and having a chain of trust to a public key infrastructure (PKI) service provider, the PKI service provider having a trust relationship with the different MNOs;

establishing, by the first network node, a secure connection with a second network node of the first MNO using the issued digital certificate and based on the trust relationship; and establishing, by the first network node, a secure connection with a third network node of a second MNO, among the different MNOs, using the issued digital certificate and based on the trust relationship, wherein the first network node is a radio unit (RU) of the first MNO, the second network node is a distributed unit (DU) of the first MNO, and the third network node is a DU of the second MNO.

7. The method as claimed in claim 6, wherein the transmitting the CSR comprises transmitting the CSR to an intermediate certificate authority (CA) of the first MNO, and the receiving the digital certificate comprises, in response to transmitting the CSR to the intermediate CA, receiving the digital certificate from an intermediate certificate authority (CA) of the first MNO.

8. The method as claimed in claim 7, wherein the intermediate CA is located within a Service Management and Orchestration (SMO) platform of the first MNO or an O-DU of the first MNO.

9. The method as claimed in claim 6, wherein the RU is a 4G or 5G RU configured with a functional radio access network (RAN) split.

10. The method as claimed in claim 6, wherein the RU is an Open RAN (O-RAN) RU (O-RU), and the DU of the first MNO and the DU of the second MNO are O-RAN DUS (O-DUs).

11. A non-transitory computer-readable recording medium having recorded thereon instructions executable by at least one processor of a first network node to perform a method of providing secure connections with a plurality of network nodes of different mobile network operators (MNOs), the method comprising:

transmitting, by a first network node of a first MNO among the different MNOs, a certificate signing request (CSR) to a public key infrastructure (PKI) service provider;

in response to transmitting the CSR to the PKI service provider, receiving, by the first network node, a digital certificate issued to the first network node and having a chain of trust to a public key infrastructure (PKI) service provider, the PKI service provider having a trust relationship with the different MNOs;

establishing, by the first network node, a secure connection with a second network node of the first MNO using the issued digital certificate and based on the trust relationship; and establishing, by the first network node, a secure connection with a third network node of a second MNO, among the different MNOs, using the issued digital certificate and based on the trust relationship, wherein the first network node is a radio unit (RU) of the first MNO, the second network node is a distributed unit (DU) of the first MNO, and the third network node is a DU of the second MNO.

12. The non-transitory computer-readable recording medium as claimed in claim 11, wherein the RU is a 4G or 5G RU configured with a functional radio access network (RAN) split.

13. The non-transitory computer-readable recording medium as claimed in claim 11, wherein the RU is an Open RAN (O-RAN) RU (O-RU), and the DU of the first MNO and the DU of the second MNO are O-RAN DUS (O-DUs).

14. The non-transitory computer-readable recording medium as claimed in claim 11, wherein the transmitting the CSR comprises transmitting the CSR to an intermediate certificate authority (CA) of the first MNO, and the receiving the digital certificate comprises, in response to transmitting the CSR to the intermediate CA, receiving the digital certificate from an intermediate certificate authority (CA) of the first MNO.

* * * * *